Patented Feb. 16, 1954

2,669,547

UNITED STATES PATENT OFFICE 2,669,547

GEL POWDER PREPARATION

Hubert A. Shabaker, Media, Pa., assignor to Houdry Process Corporation, Wilmington, Del., a corporation of Delaware No Drawing. Application April 5, 1951,
Serial No. 219,530

4 Claims. (Cl. 252—448)

The present invention relates to the preparation of finely divided gel material of controlled size range and size distribution and is particularly concerned with the production of powdered contact material, such as catalyst, for use in "fluidized bed" processes.

Among the objects of the invention are to provide improved and more economical processes for the manufacture of catalyst for use in fluidized bed hydrocarbon conversion operations.

In hydrocarbon conversion operations, including catalytic cracking and reforming, in addition to other known methods employing the catalyst as a fixed bed or as a moving compact bed, there is also known and used the so-called "Fluid Catalyst" process, wherein the catalyst is in the form of a finely divided powder suspended in gas to form a turbulent mass, and is maintained continuously in a free-flowing condition by aeration, so that the mass flows largely as a pseudo-liquid. For such processes it has broadly been suggested to use powders having a particle size of from about 2 to 3 microns to about 100 microns, the major portion being of about 20 to 80 micron size. A large portion of the very fine particles, as below about 20 micron size, initially present in the fresh catalyst added to the unit or formed in use by attrition of larger sized particles, is discharged from the unit in the vapors disengaged from the bulk of the catalyst mass and must be replaced by fresh catalyst to maintain the required quantity of catalyst in the unit.

Powders for use in fluid bed operations have been prepared by grinding of larger unsized pieces of catalytically active clay, or of synthetic siliceous gels, such as silica-alumina. A reported typical size analysis of such material in an operating cracking unit is given below:

| Roller Analysis | Wt. Percent | Screen Analysis | Wt. Percent |
|---|---|---|---|
| 0–10 microns | 0.4 | 40–80 mesh | 1.0 |
| 10–20 microns | 7.0 | 80–100 mesh | 1.6 |
| 20–40 microns | 20.5 | 100–150 mesh | 9.4 |
| 40–80 microns | 35.9 | 150–200 mesh | 18.0 |
| 80 microns and upwards | 36.2 | 200–250 mesh | 17.5 |
| | | Finer than 250 mesh | 53.3 |

Catalyst for use in fluidized bed operations has also been prepared by spray drying of hydrosols; a reported typical screen analysis of such material is given below:[1]

| Screen Analysis (USS) | Wt. Percent |
|---|---|
| On 80 | 0.4 |
| 80–100 | 1.5 |
| 100–150 | 11.9 |
| 150–200 | 20.2 |
| 200–270 | 13.8 |
| 270–325 | 7.9 |
| Thru 325 | 44.3 |

In U. S. Patent No. 2,487,065 certain methods are described for the preparation of gel type catalyst pieces by setting of hydrosol to hydrogel and drying the hydrogel while maintaining the conformation of the gel pieces as set, one of which methods involves the suspension of drops of hydrosol in a liquid immiscible therewith until the hydrosol is set to hydrogel, by which method the now familiar spheroidal bead type catalyst may be prepared. This patent describes the preparation of catalysts of acceptable hardness and improved porosity and regeneration properties, by the incorporation in the hydrosol of fine powders which are retained as such in the gel pieces set therefrom. The incorporated powder may be catalytically active or inert, and is required to be present in stated amount and of a specified size range to obtain improved gel pieces containing such powder for use in hydrocarbon conversion reactions.

In accordance with the present invention finely divided or powdered synthetic catalyst or other contact mass is prepared by first forming pieces of hydrogel containing incorporated powder and drying the same to obtain gel pieces which are then easily pulverized into powder particles of desired size range.

To obtain beads or other gel pieces capable of being readily ground, the amount of powder should be at least that sufficient for this purpose. The inclusion of less than 20% by weight powder (on basis of dry powder-containing beads) generally does not obtain the desired weak gel structure capable of easier grinding. Above about 50% by weight of powder included, the formation of discrete regular gel pieces by setting of the

[1] From Ind. & Eng. Chem. (1949), vol. 41, p. 1200.

hydrosol is extremely difficult or impossible; the mass has no coherence and the advantages of the invention are not realized. Ordinarily, the inclusion of more than about 35-40% powder by weight of the beads offers no added advantage.

It has been found that by the incorporation of an adequate quantity of powder in hydrosols capable of setting to all embracing gel, generally upwards of 20% by weight of the final dried gel produced therefrom (105° C. basis including powder), the dried gel pieces obtained are relatively weak and break up readily by grinding or crushing into particles of about the same size as the incorporated powder. Accordingly, by the methods of the present invention pulverization of gel to powder is simplified, grinding facilitated, and the production of fine particles lying outside of the desired size range materially reduced. The economics of powdered gel production is further enhanced in practice of the preferred embodiments of the invention, by initial preparation of hydrosols from reacting solutions having a high product concentration of catalytically active components, thereby reducing the load on evaporating and drying equipment. Drying and washing of the product is enhanced because the material is processed in the form of discrete particles of relatively large size and of uniform size and shape.

In practice of the invention in accordance with a preferred procedure, concentrated solutions reacting to form a hydrosol capable of setting to gel are uniformly admixed, one of the solutions including powder to be incorporated in the gel, and the hydrosol is discharged into a water-immiscible liquid by any of the known procedures for producing hydrogel beads. The globules of hydrogel thus formed containing incorporated powder are then aged in hot aqueous solutions, if desired, and partially dried to reduce the moisture content. The partially dried beads are washed and purified as by treatment with base exchange solutions removing alkali metal ions, then finally dried and ground to powder of desired size range. Since beads of good physical structure are not required, no particular precautions need be observed as to rate and conditions of drying; any simple apparatus and process obtaining rapid removal of moisture may be employed in the initial as well as in the final drying of the beads. If calcined powders or preconditioned powders of adjusted activity are desired, the beads may be readily treated at calcination temperatures in air, steam, or mixtures of these, prior to grinding.

Although other types of powder may, within the scope of the invention, be utilized for incorporation in the initial gel beads, it is advantageous to employ powder of the same composition as the required gel, since in this procedure a portion of the powder formed from grinding the powder-containing beads can be recirculated to the bead-forming step.

It is preferred to form the powder-containing hydrosol into beads of gel, since this operation provides a comparatively simple and inexpensive procedure for obtaining the desired gel pieces. It will be understood, however, that the production of spherical or spheroidal pieces of gel is not essential to the practice of the invention and the hydrosol may be set to gel in forms or molds of any desired shape, or the gel may be formed as a bulk mass and cut or otherwise divided into chunks or pieces for further treatment and grinding into powder.

The following example relates to the preparation of silica-alumina cracking catalyst. It will be understood that the same method is equally applicable to the preparation of other powdered catalysts and siliceous and other gels useful as adsorbents, catalysts or catalyst supports, including particularly silica gel, silica-magnesia and silica-zirconia; as well as three component plural oxide gels such as those containing silica, alumina and other metal oxide or metal as a catalytic component or promoter.

Example

The hydrosol is prepared by continuously flowing into a mixing head equal volumes of a silicate-powder slurry and acid alum solution of the respective compositions given below:

| Silicate Slurry | Parts by Wt. | Acid Alum Solution | Parts by Wt. |
| --- | --- | --- | --- |
| Powdered silica-alumina gel (recycled) | 13.64 | $Al_2(SO_4)_3$ | 9.35 |
| "N"-brand silicate: | | $H_2SO_4$ | 7.00 |
| $SiO_2$ | 37.12 | | |
| $Na_2O$ | 11.55 | | |
| Water | 179.90 | Water | 195.25 |

The mixture is discharged from the head through a jet into a water immiscible liquid wherein droplets of hydrosol are formed, which droplets set into spheroidal pieces of hydrogel or beads. The jet may be rotated in a horizontal plane just above the immiscible liquid while discharging a stream of hydrosol which is continuously laid down on the surface of the liquid, as disclosed for instance in the copending application of T. H. Milliken, Jr., Serial No. 41,983, filed August 2, 1948. The size of the spheroidal pieces formed is relatively unimportant and may be fixed in known manner; globules of about 2 to 10 mm. size may be conveniently formed in the practical adaptation of the present invention.

The freshly formed wet hydrogel beads thus set are removed from the immiscible liquid in any desired manner. Conveniently the beads are permitted to descend through the body of immiscible liquid into an aqueous sluicing liquid therebelow, which is also used to transport the hydrogel beads to the next processing step. Thus, a dilute solution (5%) of sodium sulfate can be used as the aqueous sluicing liquid.

The beads in the sluicing liquid pass to a drying station, and after draining the liquid from the beads the latter are dried to about 150-250% moisture content (dried basis). At this moisture content the beads can be wet processed without material rupture or breakage.

The partially dried beads are then washed and purified to remove alkali metal therefrom. Thus, zeolitically held sodium is replaced by aluminum, by treating the beads with an aluminum sulfate solution or the purification may be effected by treatment with dilute acid or with aqueous solutions of ammonium salts instead of or in addition to aluminum sulfate treatment. The thus treated material is then washed free of soluble salts by repeated water washing, and transferred to the final drying. In this stage the gel beads are brought to the moisture content desired for the dry powder, usually to about 5-10% $H_2O$ (on 105° C. dry basis).

The dried beads are then ground to desired size, as to about 40-80 micron average size, the required portion of the powder thus obtained being recirculated for incorporation in the silicate slurry used in forming the initial hydrosol.

The initial partial drying of the beads prior to washing and purification followed by a subsequent drying stage, provides certain advantages in practical handling of the beads in large scale manufacturing operations. If desired, however, a single drying stage may be employed to bring the hydrogel to desired final moisture content, the washing and purification being carried out on the wet hydrogel containing its full moisture content. Nothing is to be gained by drying the beads to low moisture content prior to washing and purification, since redrying would be required to remove wash water picked up by the gel.

Instead of using ground silica-alumina gel as powder for incorporation in the hydrosol as set out in the above example, the process can be carried out with the use of powders of different composition than the hydrogel or derived from some other source. For instance powders may be added having catalytic activity and conferring special desired properties in association with the principal gel. Clay may be added, of active or inactive type, to gel catalyst. Materials may be added in powder form to the gel beads to increase heat capacity or for other known purposes. Certain of such powders described in U. S. Patent No. 2,487,065 above referred to, may likewise be employed for incorporation in bead or other gel catalyst ultimately subjected to pulverization in accordance with the present invention.

To obtain best results from the standpoint of ease and uniformity of grinding, it is important that the powder be substantially uniformly distributed in the hydrogel. Such uniform distribution is favored by the addition of the powder to sols having a comparatively short setting time, thus preventing any tendency of local settling out of the powder during setting of the gel. The setting time of a hydrosol is dependent upon such factors as temperature, pH and concentration of the reactants. Silica-alumina hydrosols at a pH of about 5 to 9, setting in about 0.2 to 1.0 seconds, are readily obtained without temperature elevation at product concentrations above about 80 grams of $SiO_2$ and $Al_2O_3$ per liter of mixed reacting solution (not considering added powder). In general siliceous sols setting in a period of several seconds or less may be obtained at a pH of about 3-11 at an appropriate concentration of not less than about 80 grams of $SiO_2$ and $Al_2O_3$ per liter of mixed reacting solution (not considering added powder), and at about the same product concentration for other siliceous sols.

As a general rule uncontrolled or more rapid drying of hydrogel tends to produce a weaker structure in the dry gel. For this reason it is preferred to employ rather simple and inexpensive drying procedure and equipment in the initial partial drying step, if practiced, as well as in the final drying step. For instance, an ordinary rotary kiln drier having countercurrent flow of hot gas may be employed, operating at temperatures of 250–300° F. and above. During the initial drying step the gel may be rapidly dried to a moisture content of about 150–250% (on a dry solid basis), under which conditions the bulk of the gel is materially reduced, and the pieces can be readily handled in wet processing including purification by base exchange and water washing.

Any of the known types of mineral grinding equipment may be employed for disintegrating or crushing the gel beads to desired powder size. Preferably milling operations are employed which favor comminution to fairly uniform size range. Advantageously gradation and classification of the ground particles to desired size is effected simultaneously with the grinding operation, for instance by the use of closed circuit grinding wherein a gas stream removes particles of required size range. Hot gas may be used in this step to effect simultaneous removal of part of the moisture in the particles.

Purification of the gel, for instance, to remove alkali metal present therein from the initial reactants, may be effected in known manner as by treatment with base-exchange solutions containing volatile cations such as solutions of ammonium salts, or with solutions of metal salts providing a cation desired to be incorporated in the ultimate gel, which, as in the example above, may be a cation common to one of the components of the gel. In this manner further quantities of alumina are incorporated in the final gel and the composition adjusted to desired $SiO_2/Al_2O_3$ ratio.

If it is desired to market the gel powder in calcined state, the heat treatment is preferably practiced prior to grinding of the beads or other pieces of gel. The calcined pieces of gel are ground and a portion of the powder thus formed is recirculated in calcined state for incorporation in subsequent pieces of gel, as described. The use of calcined powder for incorporation in the sol provides added advantages that may largely offset any increased hardness of the pieces resulting from calcination. Because the calcined powder when present in the hydrogel pieces does not shrink to significant extent during drying of the hydrogel pieces, additional strains and lines of cleavage are set up in the gel pieces during drying and subsequent calcination, which serve to facilitate breakage along these lines during grinding and which, when the calcined powder is present in adequate amount, tends to produce on grinding the gel pieces particles having a size approximate that of the incorporated powder. For purposes other than the preparation of catalyst powders, calcination or other high temperature heat or steam treatment would not be required, and even in the case of catalyst powders such calcination or heat treatment is not always required, since the powdered gel is subjected to high temperatures prior to or during use in hydrocarbon conversion processes. Calcination of the gel in powder form may be carried out by treatment of this material in the form of a fluidized bed, in a manner similar to the employment of such beds in known catalytic hydrocarbon conversion processes.

The invention is not limited to the production of gel powders for use in "fluid" catalytic processes nor to the production of catalyst powder. The process of the invention can be employed for the production of dried gel in powder form from organosols as well as from hydrosols, and in general wherever dry gel powders are desired.

The process of the invention is especially advantageous in the preparation of powders of extremely small particle size, as in the order of 2–10 microns, which usually requires complicated and expensive grinding operations.

Obviously many modifications and variations of the invention as hereinbefore set forth may be made without departing from the spirit and scope thereof, and therefore only such limitations should be imposed as are indicated in the appended claims.

I claim as my invention:

1. In the production of ground gel powders of improved uniformity in size distribution, the method which comprises incorporating a minor portion of a dry powdered gel into a hydrosol from which the desired gel is to be set, said minor portion being incorporated in quantity sufficient to cause production of a relatively weak gel structure upon drying of the set gel and said minor portion consisting essentially of particles of at least 2 micron size and in the average size range desired for the ultimate powder product; setting the hydrosol containing the incorporated gel powder to hydrogel and drying the obtained hydrogel, thereby producing dried gel pieces of such relatively weak structure capable of being easily pulverized, and comminuting the dried gel pieces to a powder product of said desired average size range.

2. The method of producing finely divided gel catalyst of controlled size range suitable for use in "fluidized bed" operations which comprises incorporating finely divided dried gel particles of about 20–80 micron size into a hydrosol setting to the desired gel said particles being incorporated in an amount sufficient to cause production of an easily pulverizable relatively weak gel structure upon drying the said gel; setting such hydrosol containing thus incorporated powder to pieces of hydrogel in a water immiscible medium, drying the hydrogel pieces, and grinding the dried pieces to predominantly 20–80 micron size.

3. The method of preparing gel powders having a predominant particle size lying in a range of 20–80 microns which comprises incorporating dry gel powder of 20–80 micron size into a hydrosol capable of setting to hydrogel which when dried will have substantially the same composition as the powder, the amount of powder thus incorporated being about 20–50% by weight of the dry powder-included gel product produced from said hydrosol, discharging the powder-containing hydrosol into a water immiscible liquid to form spheroidal pieces of hydrogel by setting of the hydrogel in said liquid, drying the spheroidal pieces thus obtained and grinding the dried pieces to a powder product having a predominant size range of 20–80 microns.

4. The method which comprises continuously flowing into a mixing zone an acidic aluminum sulfate solution and an alkali metal silicate slurry containing powdered silica-alumina gel, admixing said slurry and solution to form a powder containing hydrosol, discharging the obtained hydrosol into a water immiscible liquid wherein droplets of the hydrosol are formed and set into globular pieces of hydrogel, removing the wet hydrogel globules thus set from the immiscible liquid, drying said globules to produce hydrogel beads having a moisture content of 150–250% on a dry basis and capable of being wet processed, treating the partially dried beads thus obtained with aqueous liquids to remove alkali metal therefrom, further drying the purified beads to final desired moisture content thereby producing easily pulverizable beads of relatively weak structure, grinding the dried beads to 40–80 micron size, recovering desired powdered gel, and returning a minor portion of the ground product to form additional slurry by admixture with alkali metal silicate solution, the amount so returned being that sufficient to furnish a quantity of powder in the hydrosol equal to 20–50% by weight of the powder-containing dry gel bead produced therefrom.

HUBERT A. SHABAKER.

References Cited in the file of this patent

UNITED STATES PATENTS

| Number | Name | Date |
|---|---|---|
| 2,435,379 | Archibald | Feb. 3, 1948 |
| 2,454,942 | Pierce et al. | Nov. 30, 1948 |
| 2,481,841 | Hemminger | Sept. 13, 1949 |
| 2,487,065 | Milliken | Nov. 8, 1949 |
| 2,535,948 | Nicholson et al. | Dec. 26, 1950 |
| 2,568,352 | Milligan | Sept. 18, 1951 |